(12) United States Patent
Shieh

(10) Patent No.: US 7,386,316 B2
(45) Date of Patent: Jun. 10, 2008

(54) ENHANCED VIDEO STREAMING USING DUAL NETWORK MODE

(75) Inventor: Peter F. Shieh, Foster City, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 581 days.

(21) Appl. No.: 10/883,909

(22) Filed: Jul. 2, 2004

(65) Prior Publication Data
US 2005/0239444 A1 Oct. 27, 2005

(51) Int. Cl.
*H04Q 7/20* (2006.01)
(52) U.S. Cl. ............... 455/445; 455/435.2; 455/452.1; 455/67.11
(58) Field of Classification Search ............ 455/414.1, 455/418, 412.2, 414.4, 420, 432.3, 445, 452.1, 455/452.2, 507, 509, 516, 517, 67.11, 62, 455/67.7, 435.2, 435.3, 446, 453, 67.16; 370/389, 428, 352, 354, 401; 725/74, 81, 725/95
See application file for complete search history.

(56) References Cited

U.S. PATENT DOCUMENTS

| 6,141,329 | A | 10/2000 | Turner | |
|---|---|---|---|---|
| 6,868,080 | B1 * | 3/2005 | Umansky et al. | 370/354 |
| 2002/0010763 | A1 | 1/2002 | Salo et al. | |
| 2002/0174434 | A1 * | 11/2002 | Lee et al. | 725/74 |
| 2003/0174774 | A1 | 9/2003 | Mock et al. | |
| 2004/0170164 | A1 * | 9/2004 | LeBlanc et al. | 370/389 |
| 2004/0179515 | A1 * | 9/2004 | Kamani et al. | 370/352 |

FOREIGN PATENT DOCUMENTS

WO   WO-02-060178   8/2002

OTHER PUBLICATIONS

Kellerer, Wolfgang, Peter Sties, and Jörg Eberspächer. "IP Based Enhanced Data Casting Services over Radio Broadcasting Networks." Piscataway, NJ: First European Conference on Universal Multiservice Networks, 2000, pp. 195-203.
Worrall, Stewart T., Simon N. Fabri, Abdul H. Sadka, and Ahmet M. Kondoz. "Prioritization of Data Partitioned MPEG-4 Video over Mobile Networks." European Transactions on Telecommunications, vol. 12, No. 3. May 2001, pp. 169-174.

* cited by examiner

*Primary Examiner*—Nay Maung
*Assistant Examiner*—John J. Lee
(74) *Attorney, Agent, or Firm*—Cooley Godward Kronish LLP

(57) ABSTRACT

A method and system for video data delivery for 3G mobile systems is disclosed. The throughput and quality of video data delivery in real-time is enhanced by using a combination of circuit-switched and packet-switched network and using optimal video frame dispatching patterns that are calculated based on transmission feedback, status of the network and QoS parameters.

22 Claims, 6 Drawing Sheets

ENHANCED VIDEO STREAMING USING DUAL NETWORK MODE

TECHNICAL FIELD

The present invention is directed to mobile communications, and more specifically to video streaming data delivery for enhancing throughput and quality in the context of mobile communications.

BACKGROUND

Customers of mobile communications are embracing 3G networks and video telephony services that are delivered using such networks. The current popularity of camera phones promises a bright future for video phones and video telephony in the 3G space. While 3G networks are capable of delivering video content to wireless devices, the throughput and Quality of Service (QoS) for real-time video delivery on 3G networks leave much to be desired. There is room for improvement in respect to transmission errors related to video delivery on 3G networks.

Cellular radio telephony companies and 3G operators currently use circuit-switched networks for voice and video telephony. Currently, mobile phone call set-up and call controls are performed over circuit-switched networks that include 2G, 2.5G and 3G networks. Circuit switching is a type of communication in which a dedicated channel is established between two end points in the network for the duration of a connection. Such a dedicated channel is well suited for transmitting data in real-time. However, the available bandwidth in a circuit-switched network is rather narrow. 3G circuit-switched networks transmit data at a rate of 64 kilo bits per sec (kpbs), and thus are not suitable for data intensive applications such as the transmission of video data in real-time. Further, the presence of interference in the cellular air interface to mobile terminals often cause data to be dropped before such data reaches the destination end point.

In view of the foregoing, a more efficient manner of transmitting video data in the context of 3G networks is needed.

DETAILED DESCRIPTION

The delivery of quality real-time video entirely through 3G environment packet-switched network is currently not feasible due to the high cost involved in a build-up of an IP network in the 3G environment.

According to certain embodiments, in the context of 3G networks, the throughput and quality of video data delivery in real-time is enhanced by using a combination of existing circuit-switched and existing packet-switched networks. In other words, the quality and error recovery can be enhanced by multiplexing real-time video data through existing circuit-switched and packet-switched networks and applying a time delay compensation factor. Optimal video frame dispatching patterns are dynamically calculated based on transmission feedback, status of the network and QoS parameters. The received video data is re-created for viewing at the receiving end-point using dynamically calculated time delay compensation and error recovery factors. The use of the combination of a circuit-switched network and one or more packet-switched networks for video data delivery to 3G mobile devices is herein referred to as a dual network mode. The use of such a dual network mode preserves the telecom service providers' investment in infrastructure for call setup and call control.

The video module that initiates a video call in a video call process is also referred herein as the caller video module. Similarly, the video module that is being called by the caller video module in the video call process is also referred herein as the caller video module. However, even though a caller video module may initially transmit video data to the caller video module, the caller video module is equipped to transmit video data to the caller video module during the connected call. In other words, both the caller and caller video modules can send and receive video data in the same connected call. For example, once a video call connection is established between two mobile devices, the video module in each of the connected mobile devices can both send and receive video data between them during the connected call. Thus, each video module as described herein comprises a video transmitter and a receiver. Video modules are described in greater detail herein with reference to FIG. 2.

Figure 1:
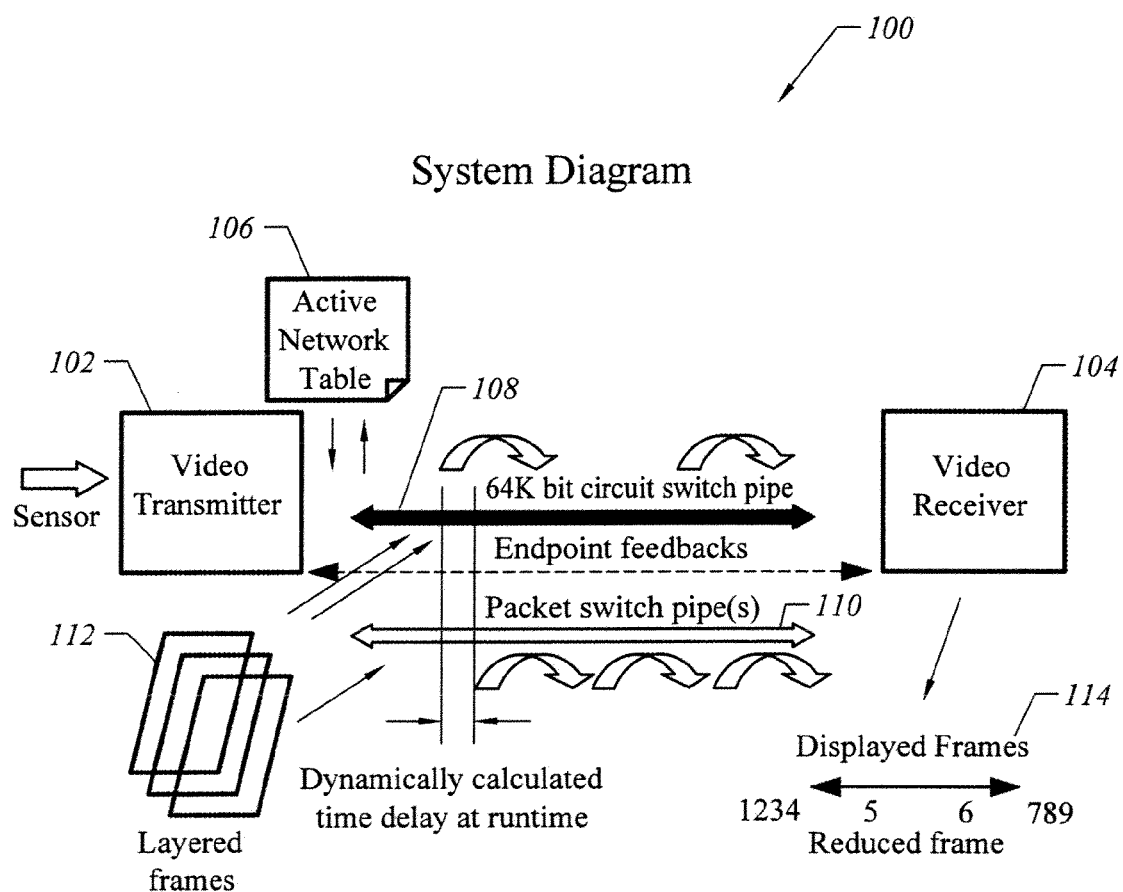
FIG. 1 is a high-level block diagram that illustrates a system for making video calls in the context of mobile communications, according to certain embodiments of the invention.

FIG. 1 is a high-level block diagram that illustrates a system for making video calls in the context of mobile communications, according to certain embodiments of the invention. For simplicity of explanation, FIG. 1 illustrates the transmission of video data from a transmitter 102 in the caller video module to a receiver 104 in the caller video module. However, as previously explained, both the caller and caller video modules are adapted for both transmitting and receiving video data. In the dual network mode, the video data is transmitted using a combination of a circuit-switched pipe 108 and a packet-switched pipe 110. The system that uses the dual network mode can comprise a plurality of active packet-switched pipes. For example, the system can comprise any combination of a 3G network, a GCM/CDMA network, and a WiFi network.

For simplicity of explanation, assume that system 100 of FIG. 1 has only one circuit-switched pipe and one packet-switched pipe. Before transmission of video data can begin, a network monitor (not shown in FIG. 1) detects and consults an active network table 106 in system 100 to determine the status of the network. The network monitor periodically updates the active network table 106.

If the network status indicates that the network allows for video transmission in the dual network mode, then video transmitter 102 can begin sending layered frames 112 using both the circuit-switched pipe and the packet-switched pipe to video receiver 104. The dual network mode is described in greater detail herein with reference to FIG. 3A, FIG. 3B, FIG. 4 and FIG. 5.

System 100 includes mechanisms for dynamically calculating optimal dispatching patterns for dispatching the layered frames 112 to video receiver 104. The dynamic calculation of optimal dispatching patterns is based on feedback provided by the caller endpoint and/or Quality of Service (QoS) parameters for the video call. For example, in the case of high error rate experienced on the packet-switched pipe, the video module is adapted to automatically dispatch most or all of the base frames (i.e., reference frames) using the circuit-switched pipe to obviate the errors that would have occurred if the packet-switched pipe is used, and thus avoid stalling of the video stream. Further, recovery from any errors that occurred in the circuit-switched pipe is enabled by using linear interpolation, or non-linear interpolation of video data obtained from the packet-switched pipe.

Similarly, system 100 includes mechanisms for dynamically calculating time delay compensation and error recovery factors for applying to the video frames that are received by video receiver 104 so that the video can be re-created for display in a manner that enhances the video viewing experience. The latency, i.e., delay in transmission, is different for the circuit-switched pipe than it is for the packet-switched pipe, thus a time delay compensation factor is applied to a video re-composition procedure at the video receiver in order to ensure the correct sequence of video delivery. Each video frame of the video stream is time-stamped before being transmitted. The video receiver buffers the incoming video frames received from both the circuit-switched and packet-switched pipes and then re-composes the video stream for sending to the video decoder. The video decoder re-creates the video for viewing.

The transmission of video data using the dual network mode results in less loss of video data. In other words, there is a reduction on the number of dropped video frames, which makes for a better quality video viewing experience.

Figure 2:
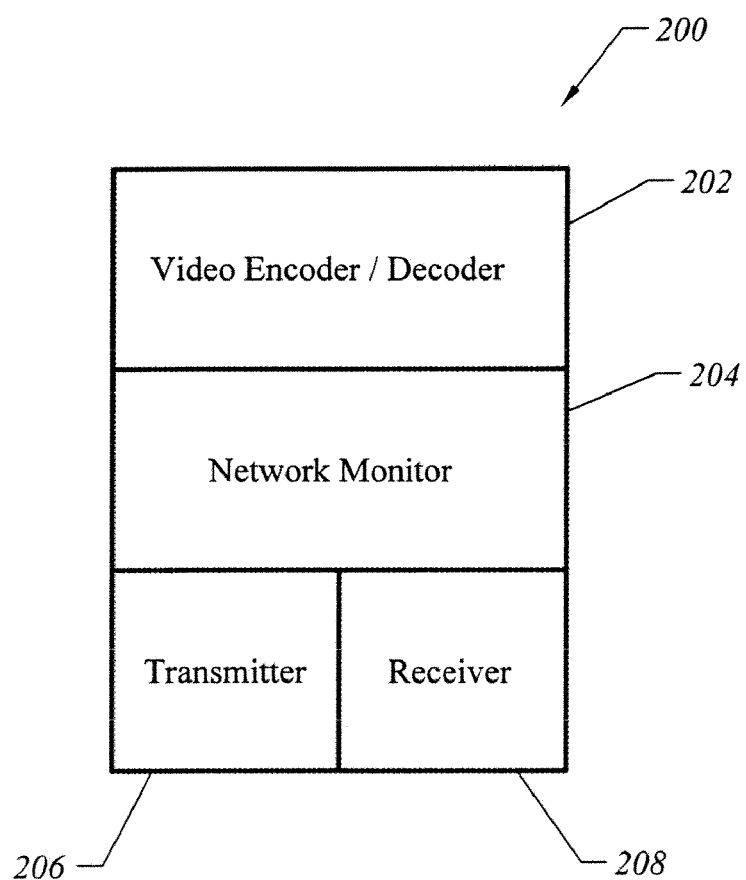
FIG. 2 is a block diagram showing some of the components that are incorporated in a video module used in certain embodiments of the invention.

FIG. 2 is a block diagram showing some of the components that are incorporated in a video module used in certain embodiments of the invention. In other words, FIG. 2 is a logical representation of a video module, according to certain embodiments. Video module 200 includes a video encoder and decoder 202, a network monitor 204, a video transmitter 206 and a video receiver 208. According to certain embodiments, a network monitor 204 resides in a communication manager associated with the video module 200. The network monitor 204 constantly monitors the network to evaluate network quality parameters such as available bandwidth, average packet delay, packet error rates, frame error rates as well as 3GPP/3GPP2 parameters. The caller communication manager and the caller communication manager communicate with each other to provide information related to the video transmission/reception and to negotiate QoS parameters, video codec and bit rates. For example, the caller communication manager determines whether the caller communication manager is of a compatible version and determines the actual bit throughput and delay. Further, the communication manager may have control over the mechanisms for dynamic calculation of optimal dispatching patterns and for calculating time delay compensation and error recovery factors. The communication manager, network monitor, encoder, decoder, transmitter and receiver may be implemented either in software, hardware or a combination of hardware and software.

Figure 3A:
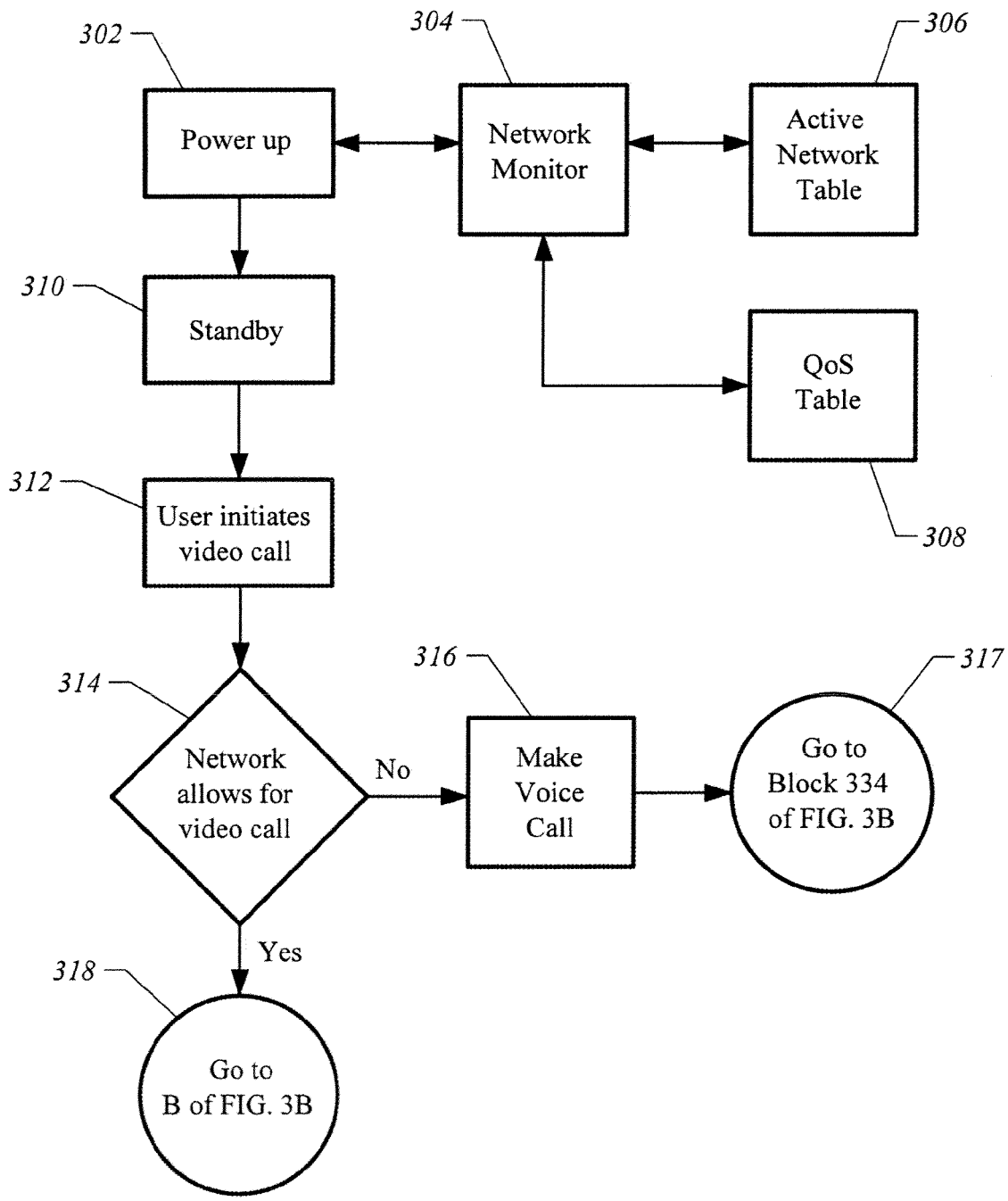
FIG. 3A and FIG. 3B illustrate aspects of a video call flow, according to certain embodiments of the invention.
Figure 3B:
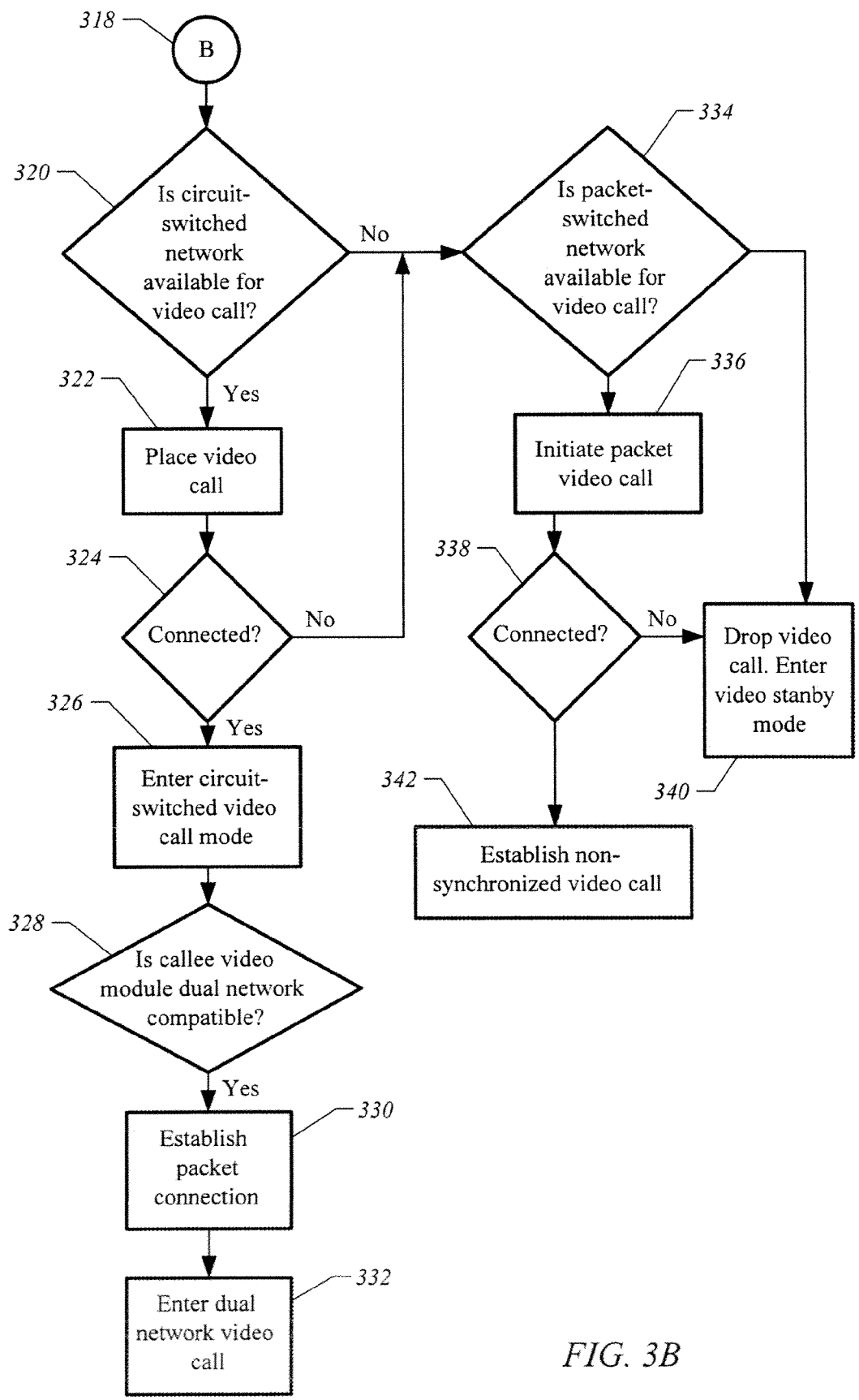

FIG. 3A and FIG. 3B illustrate aspects of a video call flow, according to certain embodiments of the invention. For purposes of explanation, assume that the network is a combination of a circuit-switched network and one packet-switched network. However, as previously explained, there may be more than one packet-switched network in the combination. In FIG. 3A, the video call flow starts when the caller video module powers up at block 302. When the caller video module powers up, the caller network manager is spawned at block 304. The caller network manager detects and periodically updates the active network table at block 306. At block 308, the network monitor initiates a QoS table and monitors the status of the network. The video module enters into video standby mode at block 310 until the user attempts to initiate a video call at block 312. When the user attempts to initiate a video call, the network monitor determines whether the network allows for a video call at block 314. In other words, the network monitors determines whether the carrier network supports video calls. If it is determined that the network does not allow for video calls, then at block 316, a voice call is made. Next at block 317, control is passed to block 334 of FIG. 3B. If it is determined that the network does allow for video calls, then at block 318 control is passed to block B of FIG. 3B.

In FIG. 3B, block B passes control to block 320. At block 320, the network monitor in the caller video module determines whether the circuit-switched network is available for a video call. If it is determined that the circuit-switched network is not available for a video call, then at block 334, the network monitor determines whether the packet-switched network is available for a video call. If the packet-switched network is available for a video call, then at block 336, the system initiates a packet-switched video call. If a connection is successfully made at block 338, then at block 342, the system establishes a non-synchronized video call. In other words, the voice and video data are not synchronized and are transmitted separately to the receiver of the caller video module. If there is no successful video call connection made with the caller video module then at block 340, the video call is dropped and the caller module enters into video standby mode.

If at block 320, it is determined that the circuit-switched network is available for a video call, then at block 322, a video call is placed. At block 324, it is determined whether a connection is made. If there is no connection, then control is passed to block 334. If there is a connection, then at block 326, the system enters the circuit-switched video call mode. At block 328, the caller communications manager determines whether the caller video module is adapted for use in the dual network mode. If the caller video module is not adapted for use in the dual network mode, then the video call is dropped at block 340. If, however, the caller video module is adapted for use in the dual network mode, then at block 330, a packet connection is established using the packet-switched network. At block 332, the system enters the dual network mode for video calls.

Figure 4:
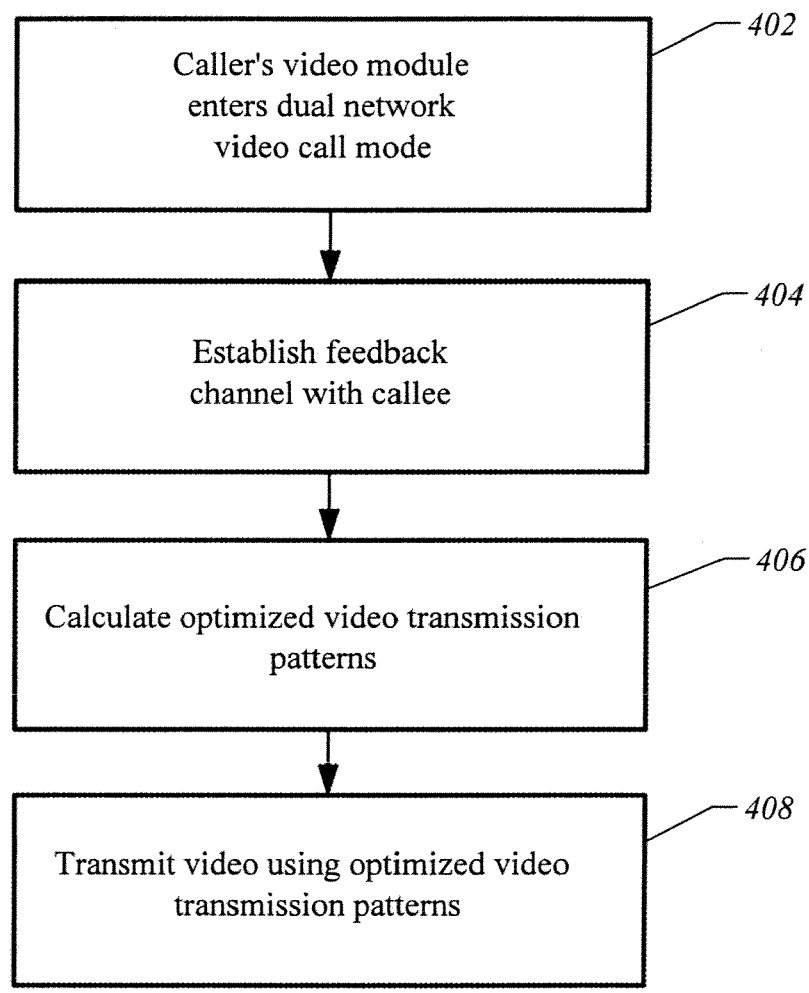
FIG. 4 is a flow chart that illustrates the operation of a video module when the video module is transmitting video data in a dual network mode, according to certain embodiments.

FIG. 4 is a flow chart that illustrates the operation of a video module when the video module is transmitting video data in a dual network mode, according to certain embodiments. In FIG. 4, at block 402, the caller's video module enters the dual network mode for video calls. At block 404, the caller's video module establishes a feedback channel with the caller's video module. At block 406, the caller communication manager dynamically calculates an optimized video transmission pattern based on the feedback received from the caller video module and based on QoS parameters. At block 408, the transmitter at the caller video module then transmits the video data using the optimized video transmission pattern.

Figure 5:
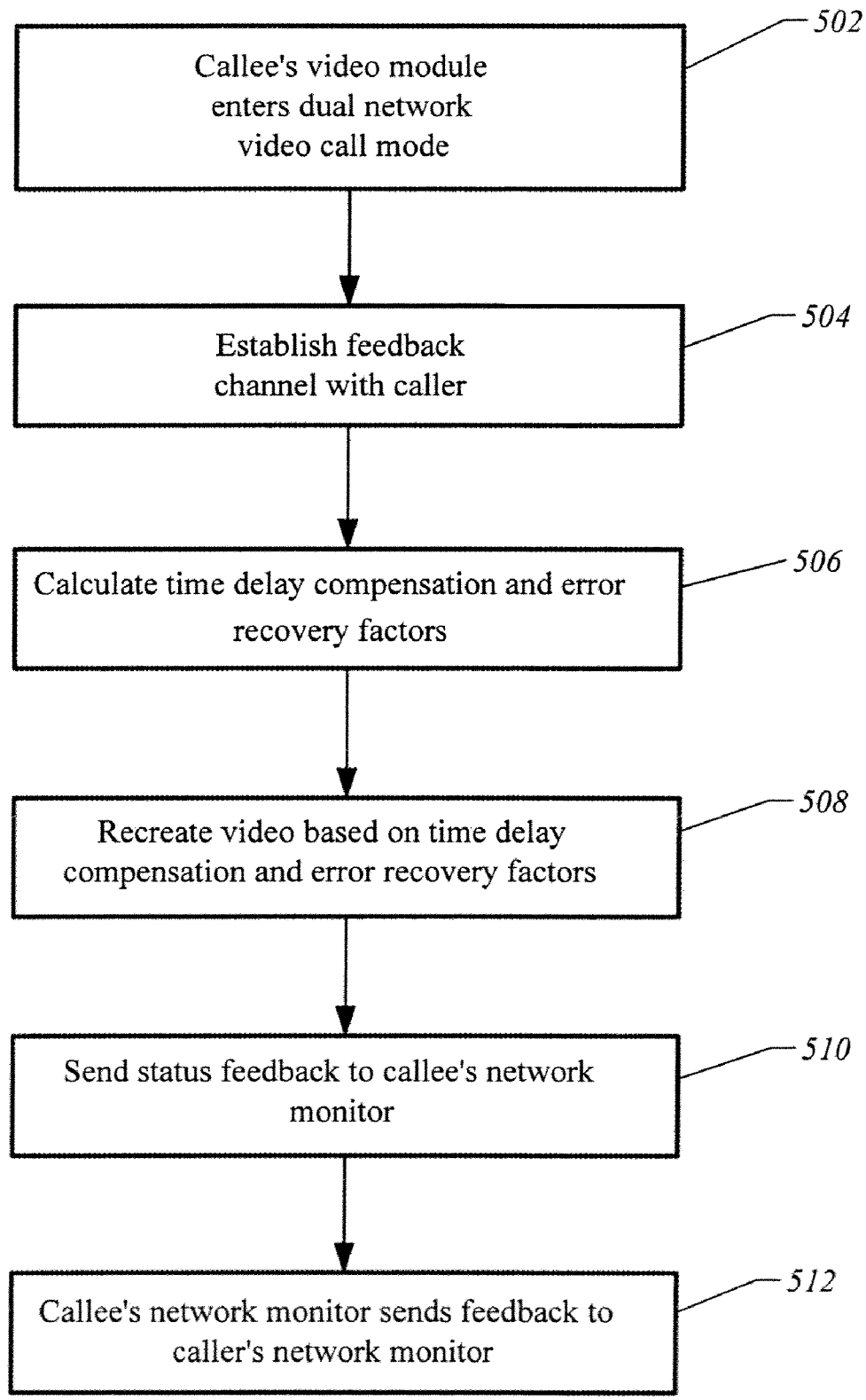
FIG. 5 is a flow chart that illustrates the operation of a video module when the video module is receiving video data in a dual network mode, according to certain embodiments.

FIG. 5 is a flow chart that illustrates the operation of a video module when the video module is receiving video data in a dual network mode, according to certain embodiments.

In FIG. 5, at block 502, the caller's video module enters the dual network mode for video calls. At block 504, the caller's video module establishes a feedback channel with the caller's video module. At block 506, the caller communication manager dynamically calculates time delay compensation and error recovery factors. At block 508, the receiver at the caller video module begins recreating the video based on the calculated time delay compensation and error recovery factors. At block 510, the caller receiver sends status feedback to the callee's network monitor. At block 512, the caller's network monitor sends feedback to the caller video monitor. The feedback channel is established in-band within the circuit-switched network. In the packet-switched network or IP implementation thereof, the feedback channel can be established inside of a packet switched network.

In the foregoing specification, embodiments of the invention have been described with reference to numerous specific details that may vary from implementation to implementation. Thus, the sole and exclusive indicator of what the invention is, and what is intended by the applicants to be the invention, is the set of claims that issue from this application, in the specific form in which such claims issue, including any subsequent correction. Any express definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

I claim:

1. A method for video data delivery in 3G mobile systems, the method comprising the computer implemented acts of:
   determining whether a set of criteria is satisfied for using a combination network comprising at least one circuit-switched network and at least one packet-switched network for dispatching a first set of video frames; and
   if said set of criteria is satisfied, then dynamically calculating optimal dispatching patterns for dispatching said first set of video frames to a caller endpoint through said combination network;
   wherein determining whether said set of criteria is satisfied further comprises:
      determining whether said at least one circuit-switched network supports video calls;
      if said at least one circuit-switched network supports video calls, then determining whether said at least one circuit-switched network is available for placing a video call; and
      if said at least one circuit-switched network is available for placing said video call, then attempting to establish a first video call connection with said caller endpoint using said at least one circuit-switched network.

2. The method of claim 1, wherein dynamically calculating optimal dispatching patterns further comprises using feedback information sent from said caller endpoint.

3. The method of claim 1, wherein if said caller endpoint desires to send a second set of video frames, then said caller endpoint dynamically calculates corresponding optimal dispatching patterns for said second set of video frames.

4. The method of claim 1, further comprising when receiving said first set of video frames by said caller endpoint, then said caller dynamically calculates corresponding time delay compensation and error recovery factors for applying to said received first set of video frames for recreating corresponding video images.

5. The method of claim 3, further comprising when receiving said second set of video frames from said caller endpoint, dynamically calculating corresponding time delay compensation and error recovery factors for applying to said received second set of video frames for recreating corresponding video images.

6. The method of claim 1, further comprising monitoring said at least one circuit-switched network and said at least one packet-switched network to evaluate a pre-determined set of parameters.

7. The method of claim 6, wherein said set of parameters include 3G mobile network requirements.

8. The method of claim 6, wherein said set of parameters include quality of service parameters.

9. The method of claim 8, wherein said quality of service parameters include available bandwidth, average packet delay, packet error rates, frame error rates on said at least one circuit-switched network, and on said at least one packet-switched network.

10. The method of claim 6, further comprising using a network monitor for detecting and updating an active network table based on results of said monitoring.

11. The method of claim 1, further comprising:
   if unsuccessful at establishing said first video call connection, then attempting to make a second video call connection with said caller endpoint using said at least one packet-switched network; and
   simultaneously with attempting to make said second video call connection, making a voice call connection with said caller endpoint using said at least one circuit-switched network.

12. The method of claim 1, further comprising:
   if successful at establishing said first video call connection, then determining whether said caller endpoint is adapted for using said combination network for receiving said first set of video frames; and
   establishing a feedback channel with said caller endpoint if said caller endpoint is adapted for using said combination network.

13. The method of claim 1, further comprising:
   if successful at establishing said first video call connection, then determining whether said caller endpoint is adapted for using said combination network for receiving said first set of video frames; and
   using only said at least one circuit-switched network for dispatching said first set of video frames if said caller endpoint is not adapted for using said combination network.

14. The method of claim 1, wherein said combination network includes one or more of: a 3G network; a GSM network; a CDMA network; a WiFi network; and a TCP/IP network.

15. A method for video data delivery in 3G mobile systems, the method comprising the computer implemented acts of:
   determining whether a set of criteria is satisfied for using a combination network comprising at least one circuit-switched network and at least one packet-switched network for dispatching a first set of video frames:
   if said set of criteria is satisfied, then dynamically calculating optimal dispatching patterns for dispatching said first set of video frames to a caller endpoint through said combination network; and
   using a computer-implemented communication manager for establishing communication with a corresponding computer-implemented communication manager associated with said caller endpoint for one or more purposes of: determining functional compatibility between said computer-implemented communication manager and said corresponding computer-implemented communication manager associated with said caller endpoint; detecting bit throughput; detecting delay; negotiating video encoding and bit rate; and negotiating other parameters associated with video transmission and reception.

16. A system for video data delivery in 3G mobile systems, the system comprising:
a computer-implemented communication manager, wherein said computer-implemented communication manager includes:
a network monitor; and
an intelligent video dispatching mechanism for dynamically calculating optimal dispatching patterns for dispatching video frames through a combination network comprising at least one circuit-switched network and at least one packet-switched network;
wherein said computer-implemented communication manager establishes communication with a corresponding computer-implemented communication manager associated with a caller endpoint for one or more purposes of: determining functional compatibility between said computer-implemented communication manager and said corresponding computer-implemented communication manager associated with said caller endpoint; detecting bit throughput; detecting delay; negotiating video encoding and bit rate; and negotiating other parameters associated with video transmission and reception.

17. The system of claim 16, further including a video encoder; a video decoder, wherein said video decoder includes a video frame recovery module and an error correction module; a transmitter; and a receiver.

18. The system of claim 16, wherein said computer-implemented communication manager detects network availability of said combination network for said video data delivery.

19. The system of claim 16, wherein if said computer-implemented communication manager is receiving video frames, said computer-implemented communication manager calculates time delay compensation and error recovery factors for applying to said received video frames for recreating corresponding video images.

20. The system of claim 16, wherein said other parameters include: QoS parameters; video codec parameters; and bit rates.

21. The system of claim 16, wherein said network monitor: monitors available bandwidth; monitors average packet delay; monitors packet error rates; and monitors frame error rates.

22. The system of claim 16, wherein said combination includes one or more of: a 3G network; a GSM network; a CDMA network; a WiFi network; and a TCP/IP network.

* * * * *

UNITED STATES PATENT AND TRADEMARK OFFICE
CERTIFICATE OF CORRECTION

| | | |
|---|---|---|
| PATENT NO. | : 7,386,316 B2 | |
| APPLICATION NO. | : 10/883909 | |
| DATED | : June 10, 2008 | |
| INVENTOR(S) | : Peter F. Shieh | |

It is certified that error appears in the above-identified patent and that said Letters Patent is hereby corrected as shown below:

Column 2:

line 26, please delete the first occurrence of "caller" and insert --callee--;
line 27, please delete "caller" and insert --callee--;
line 28, please delete "caller" and insert --callee--;
line 30, please delete the second occurrence "caller" and insert --callee--;
line 44, please delete the second occurrence "caller" and insert --callee--; and
line 46, please delete "caller" and insert --callee--.

Column 3:

line 5, please delete "caller" and insert --callee--;
line 49, please delete the second occurrence "caller" and insert --callee--; and
line 54, please delete "caller" and insert --callee--.

Column 4:

line 33, please delete "caller" and insert --callee--;
line 34, please delete "caller" and insert --callee--;
line 44, please delete "caller" and insert --callee--;
line 45, please delete "caller" and insert --callee--;
line 47, please delete "caller" and insert --callee--;
line 58, please delete "caller's" and insert --callee's--;
line 61, please delete "caller" and insert --callee--.

UNITED STATES PATENT AND TRADEMARK OFFICE
CERTIFICATE OF CORRECTION

PATENT NO.         : 7,386,316 B2
APPLICATION NO. : 10/883909
DATED                  : June 10, 2008
INVENTOR(S)       : Peter F. Shieh It is certified that error appears in the above-identified patent and that said Letters Patent is hereby corrected as shown below:

Column 5:

line 1, please delete "caller's" and insert --callee's--;
line 2, please delete "caller's" and insert --callee's--;
line 4, please delete "caller" and insert --callee--;
line 7, please delete "caller" and insert --callee--;
line 9, please delete "caller" and insert --callee--;
line 11, please delete "caller's" and insert --callee's--;
line 40, please delete "caller" and insert --callee--;
line 52, please delete "caller" and insert --callee--;
line 57, please delete "caller" and insert --callee--;
line 58, please delete "caller" and insert --callee--;
line 59, please delete "caller" and insert --callee--;
line 63, please delete "caller" and insert --callee--; and
line 64, please delete "caller" and insert --callee endpoint--.

Column 6:

line 2, please delete "caller" and insert --callee--;
line 26, please delete "caller" and insert --callee--;
line 30, please delete "caller" and insert --callee--;
line 34, please delete "caller" and insert --callee--;
line 37, please delete "caller" and insert --callee--;
line 38, please delete "caller" and insert --callee--;
line 42, please delete "caller" and insert --callee--;
line 46, please delete "caller" and insert --callee--;
line 62, please delete "caller" and insert --callee--; and
line 67, please delete "caller" and insert --callee--.

UNITED STATES PATENT AND TRADEMARK OFFICE
CERTIFICATE OF CORRECTION

PATENT NO.        : 7,386,316 B2
APPLICATION NO.   : 10/883909
DATED             : June 10, 2008
INVENTOR(S)       : Peter F. Shieh It is certified that error appears in the above-identified patent and that said Letters Patent is hereby corrected as shown below:

Column 7:

line 4, please delete "caller" and insert --callee--;
line 23, please delete "caller" and insert --callee--; and
line 28, please delete "caller" and insert --callee--.

Signed and Sealed this

Twenty-third Day of December, 2008

JON W. DUDAS
*Director of the United States Patent and Trademark Office*